June 9, 1959    A. G. FOX    2,890,328
NON-RECIPROCAL WAVE TRANSMISSION
Filed Sept. 8, 1954    3 Sheets-Sheet 2
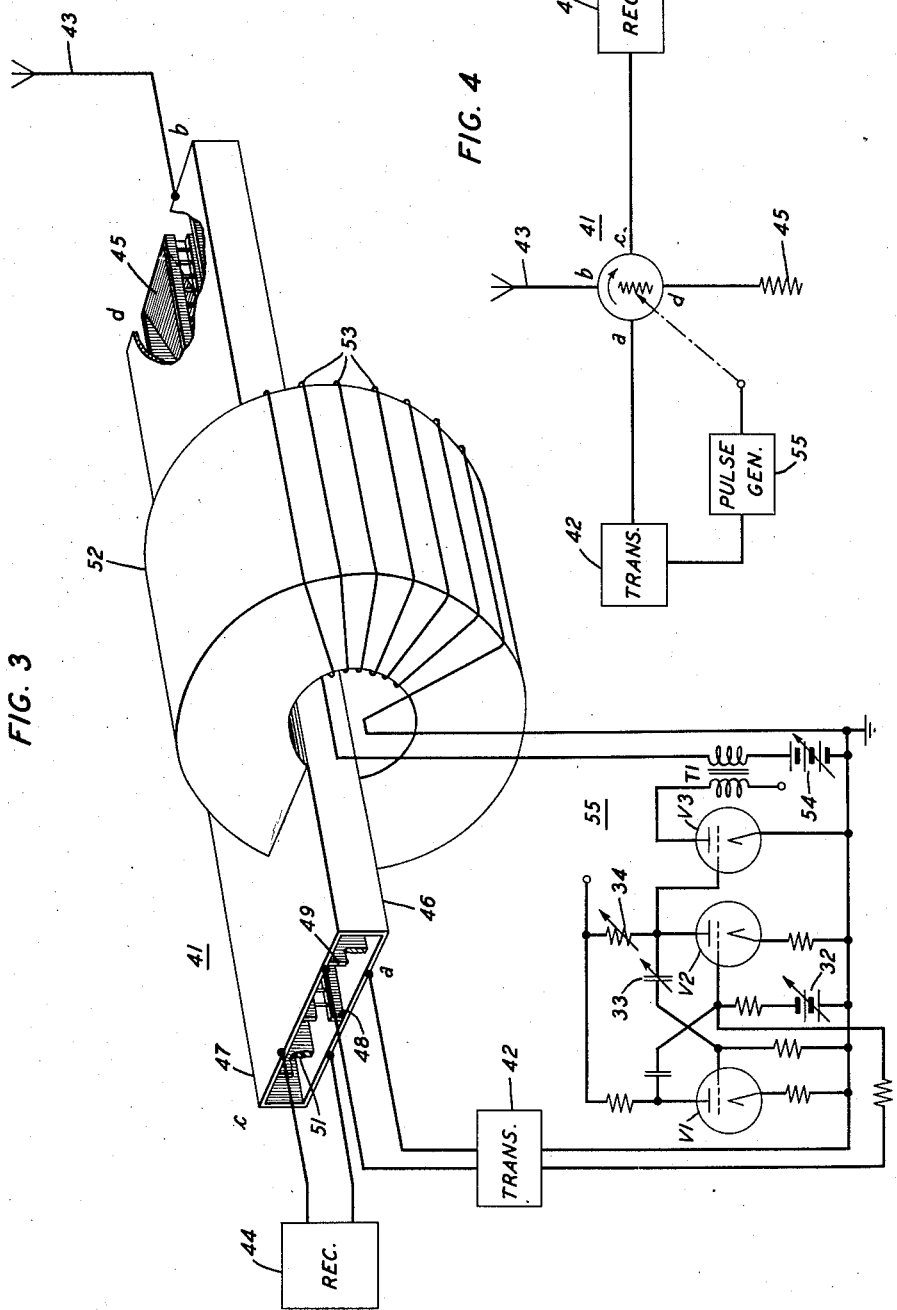
INVENTOR
A. G. FOX
BY
ATTORNEY June 9, 1959     A. G. FOX     2,890,328
NON-RECIPROCAL WAVE TRANSMISSION
Filed Sept. 8, 1954     3 Sheets-Sheet 3
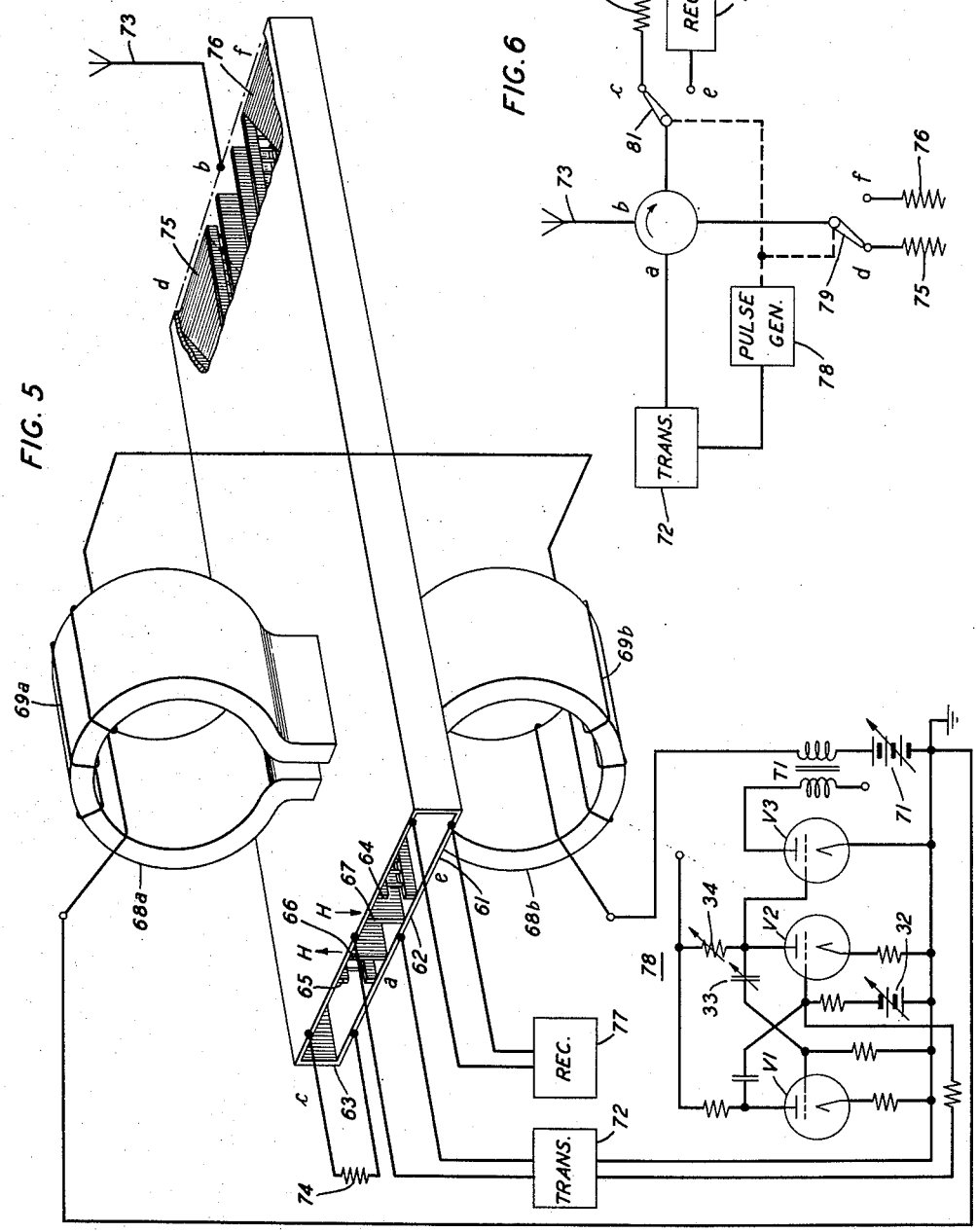
INVENTOR
A. G. FOX
BY
Hugh S. Wertz
ATTORNEY United States Patent Office 2,890,328
Patented June 9, 1959

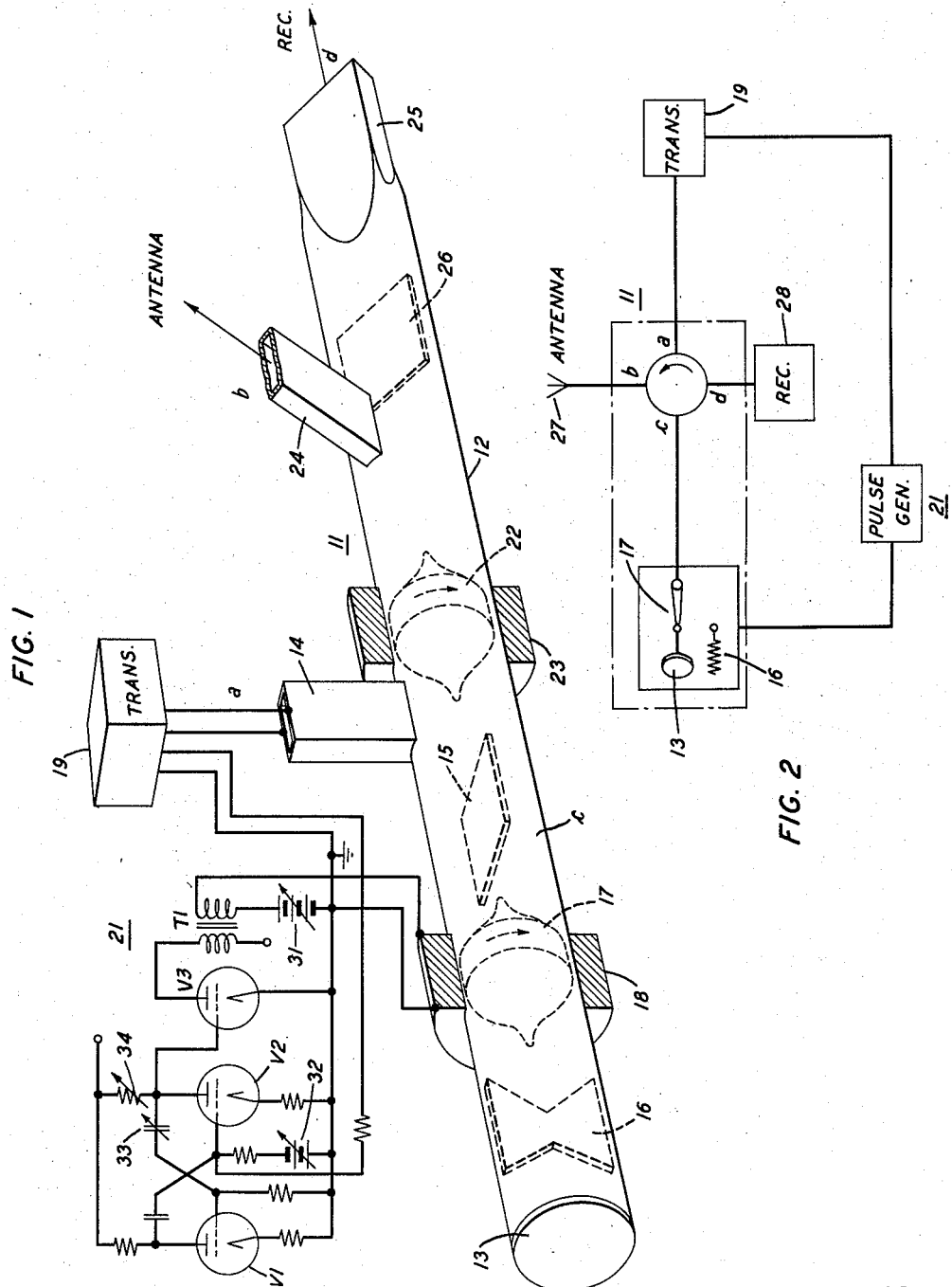

2,890,328
NON-RECIPROCAL WAVE TRANSMISSION

Arthur G. Fox, Rumson, N.J., assignor to Bell Telephone Laboratories, Incorporated, New York, N.Y., a corporation of New York Application September 8, 1954, Serial No. 454,742

13 Claims. (Cl. 250—13)

This invention relates to electromagnetic wave transmission systems and, more particularly, to multibranch circuits having non-reciprocal transmission properties for use in said systems.

A recent development in the art of electromagnetic wave transmission has been the utilization of the non-reciprocal properties of gyromagnetic materials, more commonly known as ferrites, to create an entire new family of transmission components. One of the better known and more versatile of these components is the multibranch network "circulator." While structurally circulators may differ widely from each other, they all have in common the electrical property of transmitting energy into the various branches of the network in rotation. Thus energy in one branch is coupled into another branch for one direction of transmission, and into a third branch for the opposite direction of transmission. This notation effect of the circulator permits isolation of one or more branches of the network from energy traveling in a first direction through the circulator, and complete coupling of these branches for a second direction of energy travel while affording isolation of those branches through which the energy traveled in the first direction.

Due to this ability of a circulator to separate waves traveling in opposite directions through a transmission line, it lends itself well to pulse type transmission systems, such as pulse radar systems, wherein it is desired to protect one or more components of the system during pulse transmission, and have these components fully coupled into the circuit during pulse reception.

It is an object of this invention to provide isolation of the components in a high frequency pulse transmission system by means of a simplified apparatus.

In many types of high frequency pulse transmission systems, and more particularly, in those systems wherein radio transmission is employed, the basic components consist of a transmitter, transmitting and receiving antennae, and one or more receivers. During the periods of pulse transmission, unless the transmitting antenna is perfectly matched to the pulse generator, there will be some reflection of transmitter energy from the antenna back to the pulse generator, resulting in frequency "pulling" of the pulse generator, which in turn results in both improper operating frequencies and loss of power. It is essential to the proper operation of the system that this frequency "pulling" due to antenna mismatch be prevented during pulse transmission.

It is, therefore, an object of the present invention to provide a high frequency pulse transmission circuit component which affords isolation of the pulse generator from reflected pulses from the transmitting antenna during pulse transmission.

In many types of high frequency pulse transmission systems, such as pulse radar systems, the transmitting and the receiving antennae are the same, and, consequently, both the transmitter and receiver are coupled to the antenna. Such an arrangement necessitates protection of the receiver from the relatively high power transmitter pulses during transmission, and complete coupling of the receiver to the antenna during reception, with a corresponding decoupling of the transmitter. In practice, this coupling and decoupling has been accomplished through the use of a T.-R. switch, which may take any one of a number of forms well known in the art, such as spark gaps, resonant transformers, klystrons, and the like, depending upon the various operational circumstances. The large majority of these switches depend upon the dynamic operating characteristics of gas tubes or oscillator tubes, and are necessarily, somewhat complicated both in structure and operation.

Accordingly, it is an object of this invention to provide a reliable, efficient T.-R. switch of simple construction and operation.

It is a further object of this invention to provide a single circuit component in which are combined the functions of a transmitter isolator and a T.-R. switch. In the specific embodiments of my invention, to be described in detail hereinafter, use is made of ferrite elements to achieve non-reciprocity in the multibranch network, and further, the non-reciprocal properties of the ferrite elements themselves are varied in synchronization with the associated transmitting and receiving equipment. This synchronized variation of the properties of the ferrite elements makes it possible to isolate both the transmitter and receiver with an ease and simplicity heretofore unknown in the art.

These and other objects, and the nature and advantages of the following detailed description of the of the present invention will become apparent upon consideration of various illustrative embodiments when read in conjunction with the accompanying drawings, in which:

Fig. 1 is a perspective view of a non-reciprocal multibranch network in accordance with the preesnt invention, which is employed with a pulse transmitter;

Fig. 2 is a diagrammatic representation of the network of Fig. 1 as employed in a pulse transmitting and receiving system;

Fig. 3 is a perspective view of a second specific embodiment of my invention, showing a multibranch network for use with a transmitter, antenna, and receiver;

Fig. 4 is a diagrammatic representation of the network of Fig. 3 as employed in a pulse transmission and receiving system;

Fig. 5 is a perspective view of a third specific embodiment of my invention, showing a multibranch network for use with a transmitter, antenna, and receiver; and Fig. 6 is a diagrammatic representation of the network of Fig. 5 as employed in a pulse transmitting and receiving system.

Turning now to Fig. 1, there is shown interconnecting terminals $a$, $b$, $c$ and $d$, a four branch microwave network 11 which comprises a circular wave guide 12 having a reflecting termination 13 at its left-hand end, as viewed in Fig. 1, and which is joined near the reflecting termination 13 by a section of rectangular wave guide 14 in a shunt or H-plane junction. Guide 14 will accept and support only plane waves in which the component of the electric vector determining the plane of polarization is consistent with the dominant mode of a rectangular wave guide, the $TE_{10}$ mode. The dimensions of guide 12 are preferably such that only the dominant $TE_{11}$ mode can be propagated therethrough.

A reflecting vane 15 is diametrically disposed in guide 12 to the left of the junction of guide 14 with guide 12. This reflecting vane is of the type shown in the copending application of A. P. King, Serial No. 260,137, filed December 6, 1951, now Patent 2,682,610, issued June 29, 1954, and is of highly conductive material, and of the order of one-half wavelength long. Vane 15 will reflect waves traveling through guide 12 which have a plane of polarization coincident with the plane of vane 15.

Adjacent the reflecting termination 13, and diametrically disposed within guide 12, is a vane 16 of resistive material, preferably several wavelengths long, the plane of which is at right angles to the plane of reflecting vane 15. In order to reduce reflections, the ends of vane 16 may be tapered as shown. Vane 16 will absorb or dissipate substantially all of the wave energy passing along it which has a plane of polarization coincident with the orientation of the plane of vane 16.

Interposed within guide 12 between reflecting vane 15 and dissipating vane 16 is a suitable means for producing an antireciprocal rotation of the plane of polarization of electromagnetic waves incident thereupon. In the embodiment here shown, this means comprises a Faraday-effect element 17, of the type shown and described in an article entitled, "The Microwave Gyrator" by C. L. Hogan, Bell System Technical Journal, volume 31, pages 1 through 31, January 1952. As explained in that article, when a Faraday-effect element, such as element 17, made out of gyromagnetic material, is subjected to a longitudinal magnetic field, it will rotate the plane of polarization of wave energy incident thereupon in a given direction for one direction of propagation, and in the same direction for the opposite direction of propagation. Element 17 is so proportioned, and supplied by a solenoid 18 with a magnetic field of such a value, as to give a 90 degree rotation of the plane of polarization when solenoid 18 is energized. The means for energizing solenoid 18 comprises transmitter 19 and pulse circuit 21, and will be discussed more fully hereinafter.

To the right of the junction of guide 14 with guide 12, and disposed within guide 12 is a second Faraday-effect element 22. A solenoid 23 supplies the necessary magnetic field and element 22 is so proportioned that a 45 degree rotation of the plane of polarization of wave energy passing through element 22 takes place. Any suitable means, not shown, may be used to energize solenoid 23, so long as a steady longitudinal magnetic field of the proper strength is maintained.

The mechanics of the rotation phenomenon of elements 17 and 22, as explained in the aforementioned Hogan article, and in the copending application of C. L. Hogan, Serial No. 252,432, filed October 22, 1951, now Patent 2,748,353, issued May 29, 1956, is based upon the fact that a plane polarized wave in a circular guide can be broken up into two circularly polarized components, the polarizations being opposite in sense to each other. As a result, the two component waves travel through the Faraday-effect element at different speeds, and upon emergence, recombine to produce a plane polarized wave, the plane having been rotated in space. By reversing the direction of the magnetic field, the direction of rotation may be reversed also.

To the right of element 22 and solenoid 23 is a shunt plane junction joining guide 12 and a rectangular wave guide 24 which is inclined at an angle of 45 degrees with respect to guide 14, and thus will accept from and deliver to guide 12 waves which are polarized at an angle of 45 degrees with those accepted and delivered by guide 14.

The right-hand end of guide 12 tapers smoothly into a rectangular wave guide 25, the large dimension of which is at right angles to the large dimension of guide 24. Thus, guide 25 will accept and deliver waves which have a plane of polarization rotated in space 90 degrees from the waves which guide 24 will generate in guide 12.

Between guide 24 and guide 25 is located a reflecting vane 26 which may be physically identical to vane 15 but is diametrically situated in guide 12 with its plane at an angle of 45 degrees to the plane of vane 15, and parallel to the plane of the broad wall of guide 25.

In the system as shown diagrammatically in Fig. 2, guide 14 represents terminal $a$, to which the pulse transmitter 19 is connected, guide 24 represents terminal $b$, to which the transmitting and receiving antenna 27 of the system is connected, guide 25 represents terminal $d$ to which the receiver 28 is connected, and guide 12, at a point between vane 15 and element 17, represents terminal $c$. It is obvious that other types of junctions and connections might be used equally as well, those used in Figs. 1 and 2 being merely by way of illustration.

In operation, transmitter 19 emits a pulse of wave energy which is propagated through guide 14 into guide 12. Since the E vector of this wave energy must be parallel to the narrow wall and perpendicular to the broad wall of guide 14, the wave will be converted into a $TE_{11}$ mode in guide 12, with a polarization which is coincident with the orientation of vane 15, and hence, vane 15 will reflect the wave to the right in Fig. 1, towards element 22. Element 22, being supplied with a steady longitudinal magnetic field by solenoid 23, will act to rotate the plane of polarization of the pulse in the direction of the arrow, through an angle of 45 degrees. The polarization of the pulse will then be proper for propagation through guide 24, and, since this polarization is coincident with the orientation of the plane of vane 26, substantially all of the pulse energy will be propagated through guide 24 to the antenna. Any slight amount of energy which might get past vane 26 will not reach the receiver due to the fact that the orientation of the electric field is improper for propagation through guide 25.

In the event that the guide 24 and the antenna, as well as vane 26, present impedance mismatches, a portion of the wave or pulse energy will be reflected back to the left, toward the transmitter. As this reflected energy passes through element 22 from right to left, the antireciprocal nature of element 22 will cause the polarization of the wave to be rotated 45 degrees in the direction of the arrow, thus giving the wave, upon emergence from element 22, a polarization which will have been rotated 90 degrees with respect to the original transmitter pulse wave. This polarization cannot be supported by guide 14, hence the energy will proceed past guide 14 to vane 15. Since the plane of the wave will be at right angles to the plane of vane 15, vane 15 will not reflect the wave and thus the wave will pass to the left. If element 17 at this time is not subjected to a magnetic field, the wave will pass through element 17 unaffected and, since its polarization is coincident with the plane of vane 16, the energy will be dissipated in vane 16. Any energy which passes beyond vane 16 will be reflected by reflecting termination 13 and further absorbed by vane 16 after reflection.

As soon as the transmitter pulse has been transmitted, the circuit is in condition to receive pulses such as echo pulses, in the case of a radar system. When the antenna receives a pulse, the pulse is carried through guide 24 into guide 12. The pulse will have a polarization coincident with the plane of vane 26, and improper for propagation through guide 25, hence all of the received pulse energy will be reflected to the left in Fig. 1. Element 22 will rotate the polarization of the pulse as it passes therethrough, and it will emerge from element 22 with a polarization at right angles to the plane of vane 15, and improper for propagation through guide 14. As a consequence, the energy will pass vane 15 and impinge upon element 17. If at this time element 17 is subjected to a magnetic field, it will rotate the plane of polarization of the wave 90 degrees in the direction of the arrow, and the wave will emerge from element 17 polarized at right angles to the plane of vane 16. Vane 16 will have little effect on the wave thus polarized, and it will pass vane 16 and impinge upon reflecting termination 13, which will reflect it back to the right. As the wave proceeds to the right, its polarization still being at right angles to the plane of vane 16, it will pass vane 16, and pass through element 17, which will still have a magnetic field influencing it. As a result, the wave will be rotated 90 degrees in the direction of the arrow and will emerge from element 17 polarized at right angles to the plane of vane 15, and improperly for transmission through guide 14. Proceeding to the right, the wave will be rotated 45 degrees by element 22, and will emerge therefrom polarized at right angles to the plane of vane 26 and improperly for transmission through guide 24. As a consequence, the wave energy, which will at this time be properly polarized for transmission through guide 25, will be passed through terminal $d$ to the receiver.

In the foregoing explanation, mention was made of the fact that element 22 has a steady magnetic field acting upon it, but element 17 has no magnetic field during transmission, and does have such a field during reception. Any suitable means for energizing solenoid 18 to supply the magnetic field to element 17 during reception only may be used. One such arrangement, shown merely by way of illustration, is shown in Fig. 1 as pulse generator 21.

In the generator circuit 21, an adjustable D.-C. voltage source 31 supplies solenoid 18 with sufficient voltage to enable solenoid 18 to create a longitudinal magnetic field of proper strength to accomplish, in conjunction with element 17, a 90 degree rotation of the plane of the wave energy passing through element 17. As can be seen in Fig. 1, this is a constant bias under static conditions. At the instant that transmitter 19 transmits a pulse, this steady bias must be blanked out so that the magnetic field will drop to zero and remain there for the duration of the transmitter pulse. This is accomplished in the embodiment here shown by a one shot multivibrator comprising tubes V1 and V2 and associated components. A triggering pulse is obtained from the transmitter and fed to the grid of tube V2, which is biased below cut-off by an adjustable bias supply 32. Due to the inherent time lags in both the multivibrator and the solenoid 18, it is necessary that this triggering pulse be advanced in time with respect to the transmitter pulse a sufficient amount to insure the complete cancelling of the magnetic field just prior to the application of the transmitter pulse to the multibranch network 11. One suggested method of insuring this is to place a delay line in the magnetron triggering circuit, and take the multivibrator triggering pulse from the transmitter in advance of this delay line. When this triggering pulse is fed to the grid of V2, that tube starts to conduct, and an essentially square wave pulse results. The width of the pulse is made adjustable by means of variable capacitor 33, and the magnitude of the pulse is made adjustable by means of variable resistor 34. It is necessary that the pulse length be sufficient to completely blank the solenoid voltage source 31 for the period of transmission, and yet it must not be so long that it will encroach upon the reception period. The magnitude of the pulse must be just sufficient to counteract source 31 completely, but must not be of greater magnitude. Adjustable resistor 34, pulse amplifier tube V3 and transformer T1 afford the necessary control of the magnitude of the blanking pulse. Transformer T1 serves also to insure that the pulse will be of opposite polarity with respect to source 31. It can be seen from the foregoing that circuit 21 when properly adjusted will provide the necessary pulsed operation of solenoid 18, thus insuring proper operation of multibranch network 11. This operation can be easily understood by reference to Fig. 2, wherein element 17 is shown diagrammatically as a S.P.D.T. switch connecting terminal $c$ with either resistive vane 16 or reflector 13. Switch 17 is shown in Fig. 2 in the position for reception, that is, the position of energization of solenoid 18. During the transmission period, switch 17 will complete the circuit between terminal $c$ and resistor 16, which represents the non-energization of solenoid 18.

It is to be understood that the pulsing circuit 21 as shown in Fig. 1 is one of many possible arrangements for energizing and de-energizing solenoid 18 which are readily apparent to those skilled in the art, circuit 21 being shown merely by way of illustration.

In Figs. 3 and 4, there is illustrated a second preferred embodiment of my invention having particular application to rectangular wave guide multibranch networks. This embodiment makes use of the phenomenon of gyromagnetic resonance in ferrites and similar materials to accomplish the desired isolation of the various branches of the network, and hence the isolation of the various components of the associated equipment. As was the case with Figs. 1 and 2, the multibranch network is shown in its application to a pulse transmission and reception system, such as a pulse radar system, and it is to be understood that such system is shown merely by way of illustration.

In Figs. 3 and 4 is shown a multibranch network 41 having four terminals, $a$, $b$, $c$, and $d$ to which are connected in any suitable way a pulse transmitter 42, a transmitting and receiving antenna 43, a receiver 44, and a resistive termination 45, respectively. Basically the multibranch network is a modified directional wave guide coupler of conventional design. The network 41 comprises a first section 46 of electrical transmission line which may be a rectangular wave guide of the metallic shield type, as shown. Located adjacent line 46 and contiguous thereto for a portion of its length is a second section 47 of similar wave guide. In the embodiment here shown, wave guides 46 and 47 have the same cross-sectional dimensions, although it is not absolutely necessary that this be the case. Guides 46 and 47 are coupled together for a portion of their length by a broad band coupling arrangement 48, which, in the structure here shown, forms a common wall for guides 46 and 47. This particular type of directional coupler is constructed and functions in the manner described in my copending application Serial No. 236,556, filed July 31, 1951, now Patent 2,701,342, issued February 1, 1955. The length and size of the coupler are adjusted so that a complete transfer of energy will take place between guides 46 and 47 for a given direction of propagation providing the phase velocities of the energy in the two guides are equal.

Located in guide 46, and asymmetrically disposed therein to the right-hand side of the center as viewed in Fig. 3 is a thin vane or septum 49 of a gyromagnetic material. As a specific example, this vane 49 may be made of any of the several ferromagnetic materials having a spinel structure, such as the nickel-zinc ferrite prepared in the manner described in the aforementioned publication of C. L. Hogan, "The Microwave Gyrator," and in his copending application Serial No. 252,432, filed October 22, 1951, now Patent 2,748,353, issued May 29, 1956. As illustrated in Fig. 3, vane 49 extends across the height of the guide 46 parallel to the narrow wall thereof, and extends longitudinally therein in the coupling region. Located in guide 47 and asymmetrically disposed therein to the left of the center as viewed in Fig. 3 is a thin vane or septum 51 of any suitable dielectric material which will act to vary the velocity of propagation of wave energy within guide 47. Septum 51 extends across the height of guide 47 parallel to the narrow wall thereof, and longitudinally of guide 47 in the coupling region.

Element 49 is supplied with a steady magnetic biasing field at right angles to the longitudinal and wide dimensions of guide 46 by means of a solenoid structure 52. Turns of wire 53 connected to an adjustable power source 54 are used to supply solenoid 52 with magnetizing current. The required magnetic field may be supplied by any one of a number of arrangements such as a permanent magnet, coreless solenoid, or the like, which is capable of supplying a steady magnetic bias. The arrangement here shown represents one practical illustrative way of supplying the required magnetic bias. The arrangement of Fig. 3 as so far described is similar in many respects to one arrangement shown and described in a copending application of S. E. Miller, Serial No. 371,594, filed July 31, 1953, now United States Patent 2,849,684, issued August 26, 1958. In that application is given an explanation of the effect of a polarized septum of magnetic material, situated in a wave guide asymmetrically, as element 49 is situated in guide 46, upon the phase constants of the wave guide. It has been found that such an arrangement produces a non-reciprocal phase shift or phase constant for wave energy traveling in opposite directions through the guide. This non-reciprocity is due in large part to the relationship of the magnetic field of the propagated wave to the position of the gyromagnetic element. The magnetic field of the dominant mode wave in a rectangular wave guide comprises a series of closed loops lying in planes parallel to the broad dimension of the guide. A given point on the asymmetrically located septum "sees" a rotating magnetic field as the wave energy travels past that point in a given direction. For the opposite direction of travel of wave energy, the same point still "sees" a rotating magnetic field, only now the rotation has been reversed. When the gyromagnetic septum is properly magnetized, the septum will exhibit a permeability which decreases with increased magnetization for one direction of propagation, and which increases with increased magnetization for the opposite direction of propagation. It is readily apparent that, as a result of this non-reciprocal permeability effect, the phase constants of guide 46 will be different for opposite directions of propagation when vane 49 is magnetically biased by solenoid 52.

In operation, the dielectric vane 51, the ferrite vane 49, and the strength of the magnetic field supplied by solenoid 52 are so proportioned and adjusted that, for propagation from terminal $b$ to $a$ the phase velocity of the wave energy in guide 46 is equal to the phase velocity in guide 47 for propagation from terminal $d$ to terminal $c$. When this condition obtains, it is possible to have complete power transfer of a wave traveling in guide 46 from terminal $b$ to terminal $c$ in guide 47, providing the length and height of the coupling element is suitably proportioned. However, due to the non-reciprocal nature of ferrite vane 49, the velocities of propagation for waves traveling from terminal $a$ to terminal $b$ in guide 46 and from terminal $c$ to terminal $d$ in guide 47 will be unequal, and there will be substantially no power transfer between the two guides.

If the ferrite element 49 is subjected to a greatly increased magnetic field from solenoid 52, such that the element 49 is operated at its resonance point, the condition obtained with a steady magnetic bias will be upset. With the increased magnetic bias, a wave traveling from terminal $a$ to terminal $b$ in guide 46 will be substantially unattenuated, as was the case with the smaller magnetic bias, and its velocity of propagation will differ from that of a wave traveling in the same direction in guide 47, hence, there will be no power transfer, and practically all of the energy entering guide 46 at $a$ will be delivered to terminal $b$. Resistance member 45 is located at terminal $d$ to absorb whatever small amount of energy may spill over into guide 47 through coupler 48. The non-reciprocal nature of the ferrite vane 49, when operated at its gyromagnetic resonance is such that while a wave traveling from terminal $a$ to terminal $b$ will not be attenuated, a wave traveling from terminal $b$ to terminal $a$ will be highly attenuated. In addition, the velocity of propagation will be different from that in guide 47, and there will be no power transfer, thus both terminal $a$ and terminal $c$ are substantially completely isolated from wave energy entering guide 46 at terminal $b$ when the magnetic field of solenoid 52 is at the ferromagnetic resonance value for vane 49.

The application of the arrangement of Fig. 3 to a pulse radar or similar system is obvious in view of the foregoing. Transmitter 42 transmits a pulse of energy into guide 46 at $a$. If the magnetic field of solenoid 52 is at the ferromagnetic resonance value, the transmitter pulse will travel unattenuated to terminal $b$ and thence to antenna 43. Any reflections due to antenna mismatch tending to travel from $b$ to $a$ will be completely attenuated, hence transmitter 42 is protected from these reflections. In addition, terminal $c$ and receiver 44 are isolated due both to the attenuation of the reflections and the lack of power transfer, as explained in the foregoing. After the transmitted pulse has been launched by antenna 43, the magnetic bias supplied by solenoid 52 returns to its steady, lesser value. Received pulses entering guide 46 at $b$ will be completely transferred to guide 47 and to terminal $c$ since, at the steady state magnetic bias value, the velocities of propagation in guides 46 and 47 are equal and complete power transfer occurs through coupler 48.

The arrangement for varying the magnetic field of solenoid 52 consists of a pulse generator 55 which may be, by way of example substantially identical to pulse generator 21 of Fig. 1. For convenience, the important elements of circuit 55 which are the same as those of circuit 21 have been given the same reference numeral. The variations in the magnetic field of solenoid 52 must satisfy substantially the same conditions of time relationship with regard to the transmitted and the received energy as discussed in connection with Fig. 1, hence these shall not be repeated here. The magnitude of the pulse generated by generator 55 differs however, in that it must be of the same polarity as supply source 54, and of a value such that, when added to source 54, ferromagnetic resonance in vane 49 will obtain.

Fig. 4 is a diagrammatic representation of the arrangement of Fig. 3, wherein the multibranch network 41 with the ferromagnetic element is represented by the conventional symbol for a circulator. The effect of the pulsed magnetic field is represented by a variable potentiometer as shown, signifying that variable attenuation occurs. Thus a pulse from transmitter 42 will travel in the direction of the arrow from terminal $a$ to terminal $b$. Reflected pulses due to mismatch are completely attenuated. Received pulses travel in the direction of the arrow from terminal $b$ to terminal $c$, and no attenuation takes place.

In Fig. 5 is shown a third embodiment of my invention in which the properties of gyromagnetic materials magnetized in a direction at right angles to the direction of wave propagation are utilized, as was the case in the embodiment of Figs. 3 and 4. The embodiment of Fig. 5 depends for proper operation upon the property of gyromagnetic materials which gives to the material a different permeability for different degrees of applied magnetic field. To this extent, the embodiment of Fig. 5 is similar to that shown in Fig. 3; however, the arrangement of Fig. 5 avoids the necessity of operating at or near the ferromagnetic resonance point of the material.

In Fig. 5 there is shown a multibranch network comprising a first section of rectangular wave guide 61, a second section of rectangular wave guide 62, and a third section of rectangular wave guide 63. Guide 62 is contiguous to guide 61 and they are coupled together for power transfer by a directional coupler 64 which may, for example, be the same type of directional coupler as 48 in Fig. 3. Wave guide 63 is contiguous to guide 62 and they are coupled together by a directional coupler 65 which also may be of the same type as directional coupler 48 in Fig. 3. Guides 61, 62 and 63 are so proportioned as to their cross-sectional dimensions that the phase velocity for any given mode is different for each of the three guides. Alternatively, dielectric septa similar to element 51 in Fig. 3 may be used to achieve these different phase velocities, or any other type of structure well known in the art may be used. For simplicity, the arrangement here shown utilizes different cross-sectional dimensions, but it is to be understood that applicant does not mean to limit himself to this arrangement. Located within guide 62, and asymmetrically disposed therein to the left-hand side of the center as viewed in Fig. 5 is a thin vane or septum 66 of a gyromagnetic material. This vane 66 may be of the same material as vane 49 as shown in Fig. 3 or any other of the several ferromagnetic materials having a spinel structure. As shown in Fig. 5, vane 66 extends across the height of guide 62 parallel to the narrow wall thereof, and extends longitudinally therein in the coupling region. Also located in guide 62, and asymmetrically disposed therein to the right of the center as viewed in Fig. 5 is a second vane or septum 67 of gyromagnetical material. Vane 67 may be of the same material as vane 66 or of any other of the several ferromagnetic materials having a spinel structure. Like vane 66, vane 67 extends across the height of guide 62 parallel to the narrow wall thereof and extends longitudinally therein in the coupling region. Elements 66 and 67 are supplied with a steady magnetic biasing field at right angles to the longitudinal and side dimensions of guide 62 by means of solenoid structures 68a and 68b. Turns of wires 69a and 69b connected to an adjustable power source 71 are used to supply solenoids 68a and 68b with magnetizing current so that vanes 66 and 67 will be oppositely polarized as indicated by the arrows. It is necessary that vanes 66 and 67 be oppositely magnetically polarized since they are on opposite sides of the wave guide and act on differently polarized portions of the same wave. As was the case in the embodiment of Fig. 3, the required magnetic field may be supplied by any one of a number of arrangements such as a permanent magnet coreless solenoid or the like, the arrangement here shown being merely illustrative. To the left-hand end of guide 62 as viewed in Fig. 5 is connected a pulse transmitter 72. For the sake of simplicity, this left-hand end of guide 62 shall be designated terminal a. The right-hand end of guide 62 as viewed in Fig. 5 designated terminal b is connected to a transmitting and receiving antenna 73. The left-hand end of guide 63 as viewed in Fig. 5, designated terminal c, has connected thereto a resistive or dissipative load 74 which may take any one of a number of forms well known to those skilled in the art. The right-hand end of guide 64, designated terminal d has mounted therein a wedge-shaped resistive member 75 to minimize reflections of wave energy incident thereon. Any suitable resistive or dissipative termination may be used in place of the wedge-shaped member 75 provided adequate energy dissipation and reflections are obtained. In a like manner, guide 62 has mounted in its right-hand end as viewed in Fig. 5 a wedge-shaped dissipative member 76. At the left-hand end of guide 61, designated terminal e is connected a receiver 77 which by way of illustration may be a radar receiver.

A pulse generator circuit 78 is used to supply pulses to windings 69a and 69b of solenoids 68a and 68b in a manner to be explained hereinafter. Inasmuch as a pulse generator 78 is substantially the same as pulse generators 21 and 55 of Figs. 1 and 3, respectively, and operates in the same manner, the actual operation will not be explained again, although the effect of such operation will be shown in the following explanation of the operation of the arrangement.

In operation, the strength of the magnetic field supplied by solenoids 68a and 68b is adjusted so that the effect of elements 66 and 67 is to make the phase velocity in guide 62 from terminal b to terminal a equal to that in guide 63 from terminal d to terminal c. A readjustment of the field strength will cause the phase velocity in guide 62 from b to a to equal that in guide 61 from f to e. In either case, wave energy traveling from b to a in guide 62 will be completely transferred into whichever guide has an equal phase velocity for the same direction of propagation, the coupling apertures 64 and 65 being suitably designed so this is true. When the pulse transmitter 72 transmits a pulse, pulse generator 78 will supply a pulse to windings 69a and 69b, in the same manner as explained in connection with Figs. 1 and 3. The magnitude of this pulse is just sufficient to make the magnetic field of solenoids 68a and 68b the proper value for energy transfer from guide 62 into guide 63 for the direction of travel from terminals b to a and d to c. Due to the non-reciprocal nature of the ferrite elements, there will be different phase velocities in the two guides for the opposite direction of travel and hence no energy transfer, thus the pulse from transmitter 72 will travel from terminal a to terminal b and antenna 73 without losing energy to either guide 61 or 63. Reflections from antenna 73 will be transferred into guide 63, however, and dissipated in load 74.

At the cessation of the transmit cycle, the pulse from generator 78 likewise ceases, and the magnetic field of solenoids 68a and 68b returns to its steady state value. By properly setting bias source 71, this steady state magnetic field is made the proper value to give equal phase velocities in guides 61 and 62 for the direction of travel from terminals f to e and b to a. Pulses received at antenna 73 will thus be transferred completely into guide 61 and to receiver 77.

Reference to Fig. 6, which is shown with the proper connections for the transmit cycle, will enable the operation of the system to be seen in a simple manner. Imaginary switch arms 79 and 81, connected together, are shown in order that the operation may be more readily understood. Pulse generator 78, in this diagrammatic view, acts as the solenoid of a relay, for instance, to actuate arms 79 and 81. During the transmit cycle, pulses from transmitter 72 travel from terminal a to terminal b and antenna 73, and pulses from terminal b travel to terminal c and are dissipated in load 74. During the receive portion of the cycle, pulse generator 78 throws switch arms 79 and 81 to their other positions, and pulses from terminal b travel to terminal e and receiver 77. In both cases, the non-reciprocity of the ferrites prevents energy from traveling in a direction opposite to the arrow.

The several embodiments shown and explained in the foregoing are illustrative arrangements involving the principles of my invention, and are not intended to be limiting. It is obvious that many other arrangements may be apparent to one skilled in the art without departing from the spirit and scope of the appended claims.

What is claimed is:

1. In a pulse transmission system of the type having a pulse transmitter, an antenna and a receiver for receiving pulses, means for isolating the receiver from the antenna and the transmitter when pulses are being transmitted and for preventing pulses from the antenna reaching the transmitter comprising a first section of rectangular wave guide transmission line having a given phase velocity characteristic and connected to the receiver, a second section of rectangular wave guide transmission line coupled to said first section for a portion of their lengths for energy transfer therebetween, said second section of transmission line having a different phase velocity characteristic than said first section and connected to the transmitter and to the antenna, a third section of rectangular wave guide transmission line coupled to said second section for a portion of their lengths for energy transfer therebetween, said third section having a different phase velocity characteristic than said first and second sections, means in said second section for varying the phase velocity characteristic of said second section, and control means for controlling the variation in phase velocity characteristic caused by said means in the second section, said control means being synchronized with the transmission and reception of pulses.

2. In a pulse transmission system of the type having a pulse transmitter, an antenna, and a receiver for receiving pulses, means for isolating the receiver from the antenna and the transmitter when pulses are being transmitted and for preventing pulses from the antenna reaching the transmitter as claimed in claim 1 wherein the means for varying the phase velocity characteristic of the said second section of transmission line comprises a non-reciprocal element of ferromagnetic material asymmetrically positioned within said second section of transmission line.

3. In a pulse transmission system of the type having a pulse transmitter, an antenna, and a receiver for receiving pulses, means for isolating the receiver from the antenna and the transmitter when pulses are being transmitted and for preventing pulses from the antenna reaching the transmitter as claimed in claim 1, wherein the control means for controlling the variation in phase velocity characteristic caused by said means in the second section comprises a solenoid for applying a magnetic field to said means in said second section, and a pulse generating circuit for varying the amount of magnetic field thus applied, said pulses generated by said pulse generating circuit being synchronized with the pulses generated by said pulse transmitter.

4. In a pulse transmission system of the type having a pulse transmitter, an antenna, and a receiver for receiving pulses, means for isolating the receiver from the antenna and the transmitter when pulses are being transmitted and for preventing pulses from the antenna reaching the transmitter comprising a first section of rectangular transmission line having a given phase velocity characteristic and connected to said receiver, a second section of rectangular wave guide transmission line coupled to said first section for a portion of their lengths for energy transferred therebetween, said second section of transmission line having a different phase velocity characteristic than said first section and connected to the transmitter and to the antenna, a third section of rectangular wave guide transmission line coupled to said second section for a portion of their lengths for energy transfer therebetween, said third section having a different phase velocity characteristic than said first and said second sections, means comprising a non-reciprocal element of ferromagnetic material asymmetrically positioned in said second section for varying the phase velocity characteristic of said second section, and control means for controlling the variation in phase velocity characteristic caused by said means in the second section, said control means comprising a solenoid for applying a magnetic field to said means, and a pulse generating circuit for varying the amount of magnetic field thus applied, said pulses generated by said pulse generating circuit being synchronized with the pulses generated by said pulse transmitter.

5. A pulse transmission and reception system comprising a multibranch network of waveguiding means, said network having first, second, third, and fourth terminals and a waveguiding portion common to the transmission paths between said terminals, a transmitter connected to said first terminal, a receiver connected to said second terminal, an antenna connected to said third terminal, and a dissipative element connected to said fourth terminal, at least one element of magnetically polarizable material exhibiting a gyromagnetic effect at the frequency of transmission located in said common portion of said network and effective under a first condition of applied magnetic bias to couple the terminal connected to said transmitter unidirectionally to the path of said antenna and to couple the terminal connected to said antenna unidirectionally to the terminal of said dissipating path and effective under a second condition of applied magnetic bias to block the above-mentioned couplings and unidirectionally to couple the terminal connected to said antenna to the terminal connected to said receiver, means normally producing said second condition of magnetic bias, means for pulsing said transmitter, and means responsive to said pulsing means for producing said first condition of bias when the transmitter is pulsed.

6. A pulse transmission and reception system according to claim 5 wherein said multibranch network comprises a first section of wave guide transmission line capable of supporting wave energy in at least two polarizations, a second section of wave guide coupled to said first section in a polarization selective coupling, a third section of wave guide coupled to said first section in a polarization selective coupling for a polarization at an angle to the coupled polarization between said first and second sections, a fourth section of wave guide joined to said first section by a polarization selective arrangement for a polarization normal to the polarization of the coupling between said first and third sections and at an angle to the polarization of the coupling between said first and second sections, a first non-reciprocal element in said first section between said second and third sections for effecting a rotation of the plane of polarization of wave energy propagating in said first section and wherein said element of magnetically polarizable material is located in said first section between said second section and one end of said first section for effecting a rotation of the plane of polarization of energy propagating in said first section in dependence upon the value of the applied magnetic bias.

7. A pulse transmission and reception system according to claim 6 wherein said first and second non-reciprocal elements are Faraday rotation elements of ferromagnetic material.

8. A pulse transmission and reception system according to claim 6 wherein said bias-producing means comprises a solenoid for applying a magnetic field to said second member.

9. A pulse transmission and reception system according to claim 5 wherein said multibranch network comprises a first section of rectangular wave guide transmission line having a given phase velocity characteristic, a second section of rectangular wave guide transmission line coupled to said first section for a portion of their lengths for energy transfer therebetween, said second section having a phase velocity characteristic different than the characteristic of said first section and wherein said element of magnetically polarizable material acts to vary the phase velocity and attenuation characteristics of said first section in dependence upon the applied magnetic bias.

10. A pulse transmission and reception system according to claim 9 wherein said element of magnetically polarizable material is located in said first section for varying the phase velocity and attenuation characteristics of said section and comprises a nonreciprocal element of ferromagnetic material asymmetrically positioned within said first section.

11. A pulse transmission and reception system according to claim 5 wherein said path connected to said receiver and said dissipating path, respectively, include one of two orthogonal energy supporting channels make available by polarization orientation in a common conductively bounded transmission structure, said path connected to said antenna including a third energy supporting channel made available by polarization orientation in the same conductively bounded transmission structure at an angle to both of said orthogonal channels, and said element of gyromagnetic material comprising a Farady-effect element for producing a rotation alternately between said channel included in said path connected to said receiver and said channel included in said path connected to said antenna for said first condition of bias, and between said channel included in said dissipating path and said channel included in said path connected to said antenna for said second condition of bias.

12. A pulse transmission and reception system according to claim 5 wherein said path connected to said transmitter, said path connected to said antenna, and said dissipating path include a common conductively bounded transmission structure, said path connected to said receiver including a second conductively bounded transmission structure, and said element of gyromagnetic material comprising a thin rectangular member extending longitudinally within said common structure, said first condition of bias permitting coupling between said common structure and said second structure and said second condition of bias producing gyromagnetic resonance in said member.

13. A pulse transmission and reception system according to claim 5 wherein said path connected to said transmitter and said path connected to said antenna include a common conductively bounded transmission structure, said path connected to said receiver including a second conductively bounded transmission structure, and said dissipating path including a third conductively bounded transmission structure, two thin rectangular members of gyromagnetic material extending longitudinally within said common structure, said first condition of bias permitting coupling between said common structure and said second structure, and said second condition of bias permitting coupling between said common structure and said third structure.

References Cited in the file of this patent

UNITED STATES PATENTS

| | | |
|---|---|---|
| 2,586,993 | Riblet | Feb. 26, 1952 |
| 2,644,930 | Luhrs | July 7, 1953 |
| 2,719,274 | Luhrs | Sept. 27, 1955 |
| 2,748,352 | Miller | May 29, 1956 |
| 2,748,353 | Hogan | May 29, 1956 |